United States Patent [19]
Giardina

[11] 3,848,572
[45] Nov. 19, 1974

[54] STEAM GENERATOR
[75] Inventor: Angelo R. Giardina, Broomall, Pa.
[73] Assignee: Westinghouse Electric Corporation, Pittsburgh, Pa.
[22] Filed: Aug. 9, 1971
[21] Appl. No.: 169,978

[52] U.S. Cl. .................................. 122/32, 122/34
[51] Int. Cl. ............................................. F22b 1/02
[58] Field of Search ........... 122/32, 34; 165/74, 163

[56] References Cited
UNITED STATES PATENTS
| | | | |
|---|---|---|---|
| 3,187,807 | 6/1965 | Ammon | 122/32 X |
| 3,245,464 | 4/1966 | Ammon et al. | 122/32 X |
| 3,254,633 | 6/1966 | Ammon et al. | 122/37 |

Primary Examiner—Kenneth W. Sprague
Attorney, Agent, or Firm—F. J. Baehr, Jr.

[57] ABSTRACT

A steam generator in which liquid sodium flowing through a shell portion produces steam in a plurality of modular tube bundles having a serpentine riser portion. The tube bundles originate and terminate in a plurality of channel heads disposed in a cylindrical portion of a removable head forming the upper closure for the shell. Thus, the tube bundles are removable with the removable head, and are substantially the same configuration. The shell is lined with an inner sleeve to reduce heat transfer. Heavy walled baffles cooperate with the sleeve to provide vertical compartments enclosing the serpentine portions of the modular tube bundles and vertical riser compartments free of tube adjacent each compartment having a serpentine tube bundle therein. The baffles incorporate a plurality of pressure relief devices, which are disposed between the compartments to relieve the pressure build-up, which results from a reaction between the water or steam and sodium. The tube free riser compartments provide a minimum resistance path to a large rupture disc in the removable head to relieve the pressure, thus protecting adjacent tube bundles from damage if a tube in one module fails.

6 Claims, 5 Drawing Figures

STEAM GENERATOR

BACKGROUND OF THE INVENTION

This invention relates to steam generators, and more particularly, to nuclear steam generators utilizing liquid metals heated in a nuclear reactor to convert water into steam.

The demand for electric power in the United States doubles approximately every ten years; presently fossil fuels provide the heat energy for producing the needed electrical energy. In the next 30 years, it is estimated that over 50 percent of our electrical power will be produced by nuclear energy. The supply of fissionable material is limited, so that the future of nuclear power generation depends on developing a fast breeder reactor, which produces more fissionable material than it consumes.

The steam generator has been identified as the most critical element in the development of sodium cooled fast breeder reactor plants. The major problems in designing the liquid metal or sodium-steam generator may be briefly stated as follows: minimizing areas, where a sodium and water reaction, hereinafter referred to as a sodium-water reaction, may occur and providing for harmless release of energy, if such a reaction occurs; minimizing the effects of severe thermal gradients and shock; providing suitable flow distribution and vibration characteristics for a complex compact tube bundles; and incorporating in the design solutions to the above-mentioned technical requirements at a reasonable cost.

Early designs tended to borrow heavily from conventional boiler and heat exchanger practices. In addition, to guard against possible sodium-water reactions, double tubes and double tube sheets with an inert third fluid were employed. The elaborate designs tended to be self-defeating, since the resulting mechanical complexity made fabrication difficult, quality control a challenge, and field repairs nearly impossible.

The next step was a once through, force circulation, single wall design, wherein sodium flows downwardly and water or steam flows through the tubes. In this design ferritic materials are employed throughout. Since ferritic materials exhibit low strength at high temperature, excessively thick parts are required. Annular shaped tube plates similar to those shown in U.S. Pat. No. 3,126,949 are utilized for both the water and steam side, and are located at the top of the unit. The tube plates and the resultant oddly shaped water and steam chambers are not ideally shaped for containing present day steam pressures and temperatures. In addition, such units are difficult to manufacture due to the large shell diameters requiring thick walls and closures.

Later designs utilize simple vertical cylindrical units, comprising essentially straight tubes having a sine wave curve to accommodate differential expansion. Again, sodium flows downwardly on the shell side, and water or steam flows through the tubes. Stainless steel is used throughout, except the tubes are bi-metallic. A metallurgically bonded Inconel liner is disposed within the stainless steel exterior. These bi-metallic tubes introduced fabrication difficulties and are expensive.

Vertically oriented once-thru force circulation designs employing helical coiled tubes have been utilized and require very long tubes, which are not commercially available. Hence, welds are required to make tubes of the proper length. The chief disadvantage of this design is its large size, which is difficult and costly to fabricate.

SUMMARY OF THE INVENTION

In general, a vapor generator for transferring heat from a primary fluid to a secondary fluid to vaporize the secondary fluid, when made in accordance with this invention, comprises in combination a vertical cylindrical shell portion, a lower head portion, an upper removable head portion, and a level to which the primary fluid fills the shell, when the vapor generator is operating. The vapor generator further comprises in combination a nozzle for introducing primary fluid to the upper portion of the shell, below the liquid level, a nozzle for removing primary fluid from the lower portion of the shell, a plurality of modular tube bundles, each tube bundle comprising a generally vertical downcomer portion and a serpentine riser portion, the latter portion being disposed below the liquid level. The upper removable head portion has a cylindrical wall portion, and the cylindrical wall portion has at least one head portion for each modular tube bundle extending radially outwardly therefrom, and the tube bundles and the associated heads are disposed so that the inlet and outlet end portions of the tube bundles extend horizontally prior to terminating in the associated head, providing an arrangement, wherein each tube bundle is essentially the same configuration and the tube bundles are removable from the shell with the upper head.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
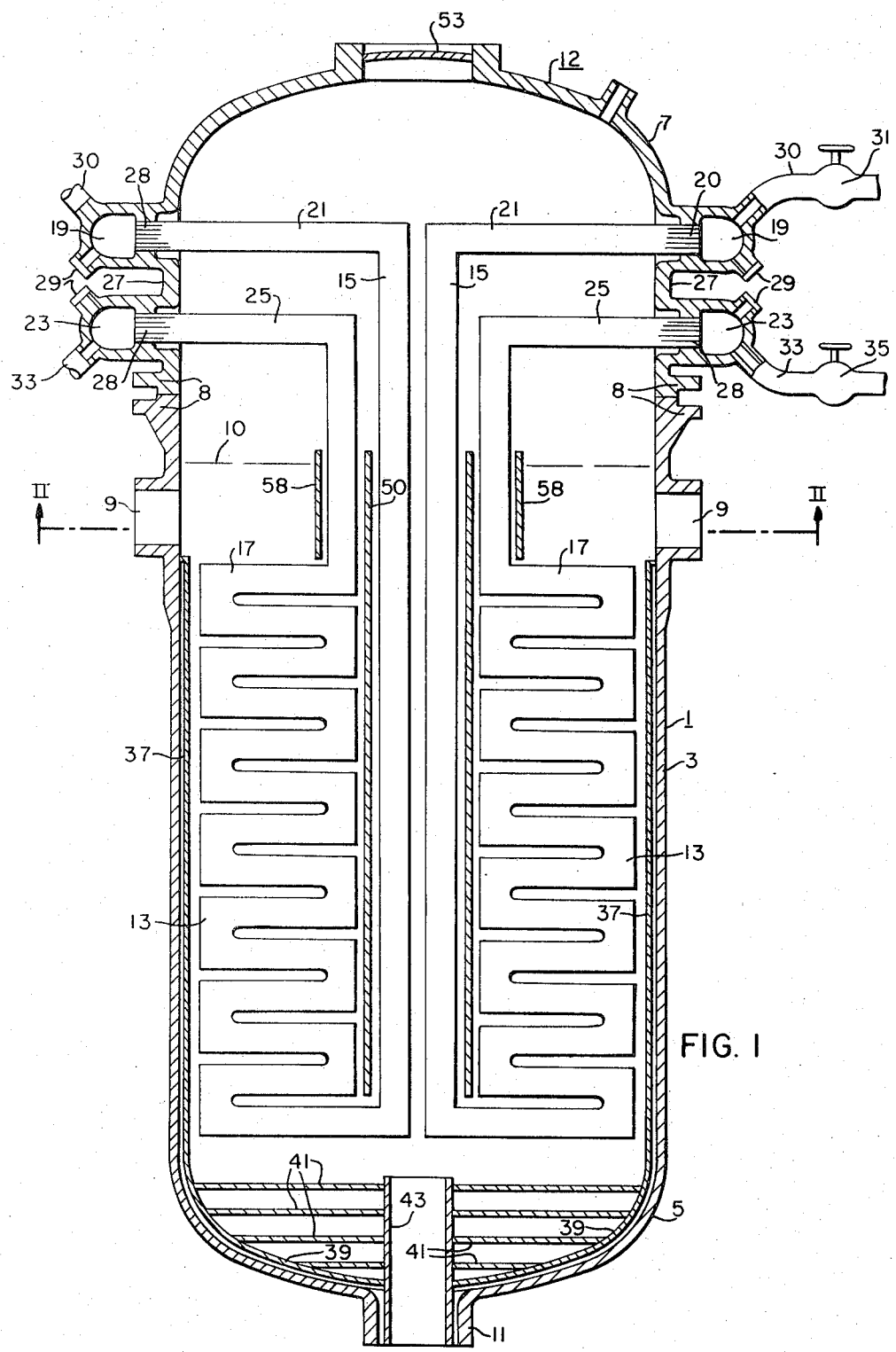
FIG. 1 is a vertical sectional view of a steam generator made in accordance with this invention, in which the nozzles and steam and water channel heads are not shown in their proper orientation, but are disposed at the correct elevation.

Referring now to the drawings in detail, FIG. 1 shows a steam or vapor generator 1 for transferring heat from a primary fluid, such as sodium, potassium, or other liquid metal, to a secondary fluid, such as water to boil or vaporize the water to form steam. The steam generator 1 comprises a vertical cylindrical shell portion 3, a lower head portion 5 and an upper removable head portion 7, joined to the shell 3 by a pair of companion flanges 8, and a pair of diametrically opposed primary fluid inlet nozzles 9. The inlet nozzles 9 are disposed in the shell 3 below the liquid level 10, that is, the level to which the primary fluid fills the shell, when the steam generator is operating. A primary fluid outlet nozzle 11 depends from the lower head 5. The liquid level in the shell is maintained by supplying pressurized inert gas to the upper head 7, as indicated at 12, to provide an inert gas blanket in the upper head portion of the steam generator.

A plurality of modular tube bundles 13 of substantially the same configuration are disposed within the shell 3 and depend from the upper head portion 7. Each tube bundle 13 comprises a generally vertical downcomer portion 15, which extends downwardly to the lower head portion 5 and a serpentine riser portion 17. The serpentine riser portion 17 extends upwardly from above the lower head 5 to just below the liquid level 10. The tube bundles 13 each contain a plurality of thin walled tubes 14, approximately one-half inch in diameter. The tubes 14 are approximately 65 feet long, thus they are continuous and have no butt welds.

Figure 5:
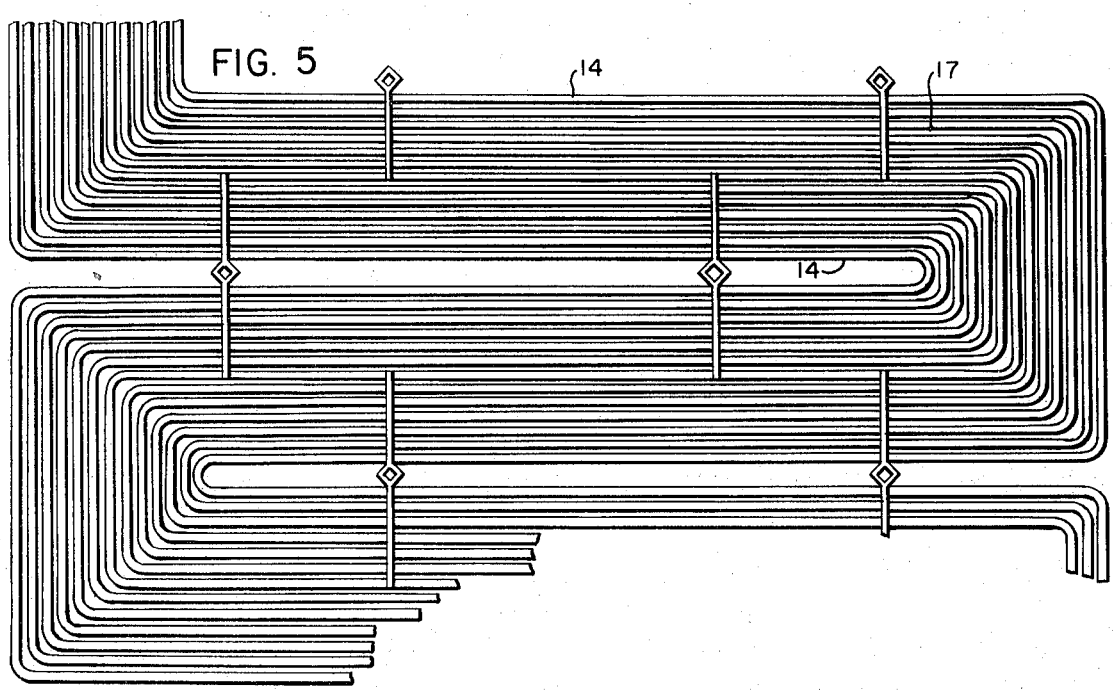
FIG. 5 is an enlarged partial sectional view showing the serpentine nesting of the tubes forming a tube bundle.

As shown in FIG. 5, the small diameter allows thin walls and permits the tubes 14 to be bent in sharp hair pin turns so that the serpentine riser portions can comprise a plurality of closely packed tubes having a minimum radius reverse bend on the inner tube of each reverse bend portion of the serpentine riser portion 17 of the tube bundle 13.

Figure 2:
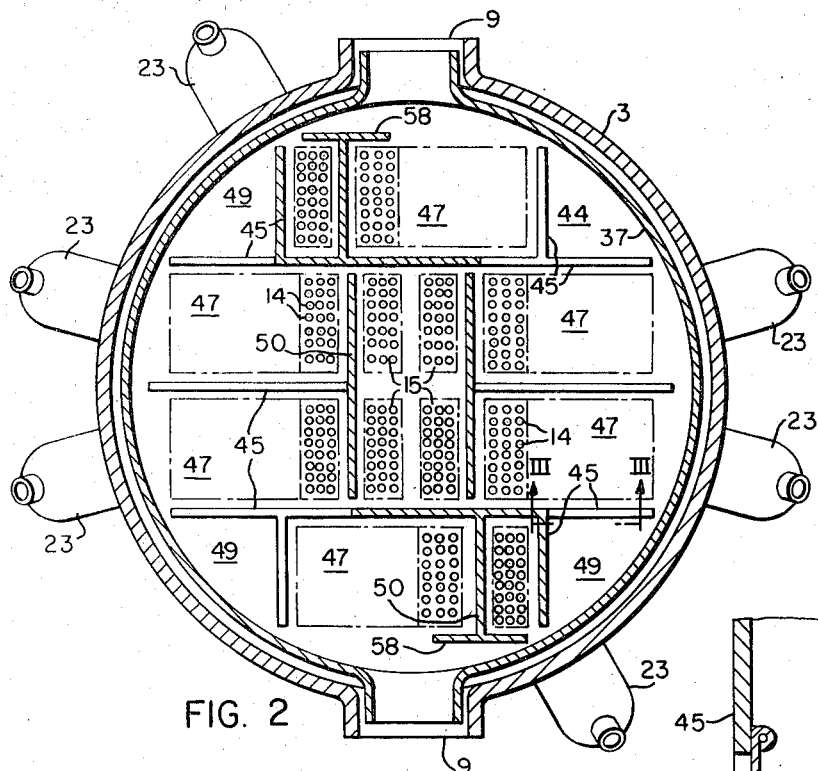
FIG. 2 is a sectional view taken on line II—II of FIG. 1, showing the proper orientation of the nozzles.

As shown in FIG. 2, six modules are nested within an 8½ ft. diameter shell. Each module is substantially the same configuration. The downcomer portion 15 is connected to an inlet channel head 19 by a horizontal portion 21, and the serpentine riser portion 17 is also connected to an outlet channel head 23 by a horizontal portion 25. The inlet channel head 19 for each tube bundle is disposed vertically above the associated outlet channel head 23 in a cylindrical wall portion 27 of the upper head 7, so that the tube bundles 13 are removable with the upper head 7. The tube bundles 13 are essentially the same configuration; the only difference between the modules being the angle at which the horizontal portions 21 and 25 make with the plane of the serpentine portions 17.

The channel heads 19 and 23 are generally hemispherical and have circular flat tube sheets, 28. An inspection port 29 is provided in each head so that the end of each tube is accessible for inspection and maintenance.

Inlet piping or conduits 30 supply feed water to the inlet channel heads 19, and have an isolation or shut off valve 31 disposed in each conduit; and steam outlet piping or conduits 33 provide an outlet for the channel heads 23 and have an isolation or shut off valve 35 disposed in each outlet conduit 33. The valves 31 and 35 cooperate to provide means for interrupting the flow of water and steam to and from each modular tube bundle 13 to permit continuous operation of the steam generator, if there is a tube failure in one tube bundle.

As shown in FIGS. 1 and 2, the shell 3 has a vertical sleeve member or liner 37 disposed inside and adjacent the shell to provide an annular quiescent zone between the shell 3 and the sleeve member 37 to reduce the heat transfer through the sleeve and minimize the effect of thermal gradients in the shell and also reduce corrosion of the shell.

The lower head 5 has an inner cap liner 39 generally conforming to the shape of the lower head 5 and spaced a small distance therefrom to form a quiescent zone adjacent the lower head. A plurality of horizontal plates 41 are disposed in the lower head 5 to form a thermal shield. A sleeve 43 extends through central openings in the plates 41 and through the primary fluid outlet nozzle 11, to provide a quiescent zone adjacent the outlet nozzle 11 to protect the juncture between the shell 3 and the nozzle 11 from thermal gradients.

As shown in FIG. 2, a plurality of vertical interconnected baffles 45 of substantial thickness and strength are disposed between adjacent tube bundles 13 and cooperate with the liner 37 to generally wall off each serpentine riser portion 17 of each tube bundle 13, thus forming a generally enclosed compartment of column 47 around each tube bundle and a riser compartment or column 49 free of tubes adjacent each column 47 having the serpentine tubes therein. The tube bundles 13 also have relatively thin baffles 50 separating the downcomer portion 15 from the riser portions 17. The baffles 45 and 50 are cooperatively disposed to provide a counter flow relation between the sodium and the water and to promote operational stability and minimize stratification of the sodium. The baffling is also arranged to provide equal distribution of primary fluid to each of the columns 47 and to prevent the flow of primary fluid in columns 49, thus optimizing the units heat transfer characteristics.

Figure 3:
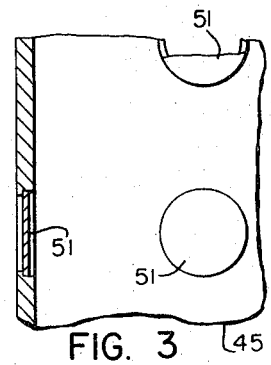
FIG. 3 is a partial sectional view taken on line III—III of FIG. 2.

The baffles 45 have heavy walls with some type of pressure relief device disposed therein. FIG. 3 shows the baffles 45 with a plurality of rupture discs 51 disposed therein. If there is a tube failure and a resulting pressure build-up from the sodium-water reaction, the rupture discs 51 will relieve the pressure into the riser column 49, which is free of tubes. Thus, the resulting pressure from the sodium-water reaction will be relieved through the tube free column 49 to the gas filled upper head 5, which has a large rupture disc 53 disposed therein, protecting adjacent tube bundles from damage. The disc ruptures at a substantially lower pressure than would materially damage the apparatus as a whole, to vent the products of any sodium-water reaction that may occur.

Figure 4:
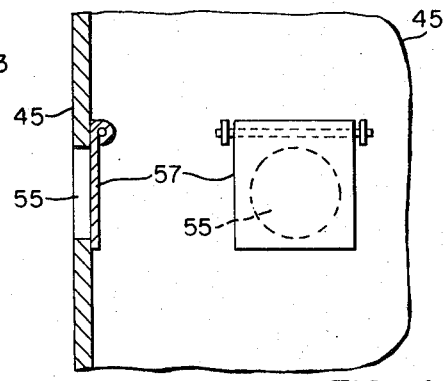
FIG. 4 is a view similar to FIG. 3, showing a modification.

FIG. 4 shows a modification in which the baffles 45 have a plurality of holes 55 covered by hinged plates 57, which act as swing check valves, so that if there is a tube failure, the resulting pressure build-up is relieved through the holes 55 to the tube free riser column 49, which provides a minimum resistance path to the large rupture disc 53 in the upper head 7. The hinged plates 57 provide unidirectional relief so that the pressure in any column having tubes can relieve itself into the adjacent tube free riser column 49 without affecting the adjacent column 47 with tubes.

An impingement baffles 58 is disposed adjacent each primary fluid inlet nozzle 9 preventing incoming sodium from impinging directly on the tubes to eliminate vibration problems caused by the influent primary fluid.

The invention as hereinbefore described, besides providing a highly reliable liquid metal steam generator at low cost, also has the following advantages:

1. The tube bundles 13 are sub-assembled into six modules, considerably reducing the manufacturing time.

2. The compartmentalization of the shell 3 offers a significant advantage in limiting the effects of a sodium water accident. The blow-out type baffles 45 provided along the side of each compartment will release explosion products into the riser column 49, which provides a minimum resistance path to the large rupture disc 53 in the upper head 7, to limit the resulting damage to one modular tube bundle 13.

3. Individual inlet and outlet tube sheets 28 in the channel heads 19 and 23 are relatively small in diameter, and are hence thinner. They are also circular in shape and may be readily analyzed for pressure and thermal stresses.

4. The entire tube bundle 13 is removable from the shell 3 for maintenance.

5. The modular construction permits isolation of any individual module by providing shut off valves 31 and 33 in the water and steam piping.

6. All tube sheets 28 are in the gas space in the upper head 7 so that the junction between the tubes 14 and tube sheets 28 are protected from sudden thermal transients that occur in the sodium region of the vessel.

7. The modular construction allows standardization of the individual tube bundles 13 and permits the customer to stock a spare module to minimize down time in the event of operational difficulties.

8. The compact design permits shipping of the steam generator in one piece, eliminating the need for extensive field fabrication.

9. The length of the tubes are such that continuous lengths are commercially available; therefore butt welded tubes, which are a source of potential failure, are not utilized.

10. All the tube ends are accessible for inspection and repair, through the inspection ports 29 in the channel heads 19 and 23.

11. The floating ends and numerous reverse bends provide for unrestricted thermal expansion of the tubes.

12. The identical configuration of the tube modules allows repetitive manufacturing techniques, which reduce manufacturing cost and improve the quality of the modules.

What is claimed is:

1. A vapor generator for transferring heat from a primary fluid to a secondary fluid to vaporize said secondary fluid, said vapor generator comprising in combination:

a vertical cylindrical shell portion,
a lower head portion,
an upper removable head portion,
a level to which said primary fluid fills said shell, when said vapor generator is operating,
means for supplying inert gas to said upper head to maintain said level,
means for introducing primary fluid to the upper portion of said shell below said level,
means for removing primary fluid from the lower portion of said shell,
a plurality of modular tube bundles,
each tube bundle comprising a generally vertical downcomer portion and a serpentine riser portion, the latter portion being disposed below said level, said upper removable head portion having a cylindrical wall portion,
said cylindrical wall portion having at least one head portion for each modular tube bundle extending outwardly therefrom,
said tube bundles and their associated heads being so disposed so that the inlet and outlet end portions of said tube bundles extend generally horizontally prior to terminating in the associated heads providing an arrangement wherein each tube bundle is essentially the same configuration, and the tube bundles are removable from the shell with the upper head portion,
a cylindrical sleeve member disposed adjacent said shell to provide an annular quiescent zone between said shell and said sleeve member,
a plurality of baffles disposed between adjacent tube bundles and cooperating with the sleeve member to generally wall off each serpentine portion of each tube bundle in a compartment and provide a riser compartment free of tubes adjacent each compartment having the serpentine tubes disposed therein, said baffles having heavy walls capable of withstanding high pressure differentials, and
a plurality of pressure relief means disposed within said walls,
said pressure relief means being adapted to relieve pressure build-up in the compartments having the serpentine tubes disposed therein.

2. A vapor generator as set forth in claim 1, wherein the pressure relief means are unidirectional and provide relief only into a riser compartment from an adjacent compartment having serpentine tubes therein.

3. A vapor generator as set forth in claim 2 and further comprising pressure relief means disposed in the upper head whereby the pressure build-up due to failure of a serpentine tube in any one tube bundle module is relieved into the adjacent riser compartment and is subsequently relieved through said relief means disposed in the upper head, thus protecting the other tube bundles from damage.

4. A vapor generator for transferring heat from a primary fluid to a secondary fluid to vaporize said secondary fluid, said vapor generator comprising in combination:

a vertical cylindrical shell portion,
a lower head portion,
an upper removable head portion,
a level to which said primary fluid fills said shell when said vapor generator is operating,
means for supplying inert gas to said upper head to maintain said level,
means for introducing primary fluid to the upper portion of said shell below said level,
means for removing primary fluid from the lower portion of said shell,
a plurality of modular tube bundles,
each tube bundle comprising a generally vertical downcomer portion and a serpentine riser portion, the latter portion being disposed below said level, a plurality of baffles disposed between adjacent tube bundles and cooperatively associated with the sleeve member to generally wall off each serpentine portion of each tube bundle in a compartment and provide a riser compartment free of tubes adjacent each compartment having the serpentine tubes disposed therein,
said baffles having heavy walls capable of withstanding high pressure differentials and having a plurality of pressure relief means disposed therein, and
said pressure relief means being adapted to relieve pressure build-up in the compartments having the serpentine tubes disposed therein.

5. A vapor generator as set forth in claim 4, wherein the pressure relief means are unidirectional, providing relief only into the riser compartment from the adjacent compartment having the serpentine tubes disposed therein.

6. A vapor generator as set forth in claim 5, and further comprising pressure relief means disposed in the upper head whereby the pressure build-up resulting from failure of a serpentine tube in any one tube bundle module is relieved into the adjacent riser compartment, and the pressure build-up in the riser compartment is relieved through said relief means in the upper head, preventing damage to the other tube bundles.

* * * * *